(12) United States Patent
Nguyen et al.

(10) Patent No.: US 11,282,640 B2
(45) Date of Patent: Mar. 22, 2022

(54) DC LINK CAPACITOR COOLING SYSTEM

(71) Applicant: KARMA AUTOMOTIVE LLC, Irvine, CA (US)

(72) Inventors: Khanh Nguyen, Garden Grove, CA (US); Geng Niu, Irvine, CA (US)

(73) Assignee: KARMA AUTOMOTIVE LLC, Irvine, CA (US)

( * ) Notice: Subject to any disclaimer, the term of this patent is extended or adjusted under 35 U.S.C. 154(b) by 231 days.

(21) Appl. No.: 16/382,601

(22) Filed: Apr. 12, 2019

(65) Prior Publication Data

US 2020/0328026 A1    Oct. 15, 2020

(51) Int. Cl.
| | | |
|---|---|---|
| H01G 2/08 | (2006.01) | |
| H01G 4/228 | (2006.01) | |
| H01G 4/38 | (2006.01) | |
| H01G 4/32 | (2006.01) | |
| H01G 4/40 | (2006.01) | |

(52) U.S. Cl.
CPC ............. *H01G 2/08* (2013.01); *H01G 4/228* (2013.01); *H01G 4/32* (2013.01); *H01G 4/38* (2013.01); *H01G 4/40* (2013.01)

(58) Field of Classification Search
CPC .............. H01G 11/82; H01G 2/08; H01G 2/04
See application file for complete search history.

(56) References Cited

U.S. PATENT DOCUMENTS

| | | | |
|---|---|---|---|
| 5,953,201 A | 9/1999 | Jakoubovitch | |
| 2010/0259898 A1* | 10/2010 | Kimura | H05K 7/209 361/704 |
| 2011/0149625 A1* | 6/2011 | Azuma | B60L 50/61 363/141 |
| 2014/0334105 A1* | 11/2014 | Chen | H05K 7/20509 361/714 |
| 2017/0221633 A1 | 8/2017 | Sato et al. | |
| 2017/0346143 A1 | 11/2017 | Deser et al. | |
| 2018/0358666 A1 | 12/2018 | Siering et al. | |

FOREIGN PATENT DOCUMENTS

| | | | | |
|---|---|---|---|---|
| CN | 108 735 509 A | 11/2018 | | |
| DE | 10 2011 007 315 A1 | 10/2012 | | |
| DE | 102011007315 A1 * | 10/2012 | ............. | H01G 2/08 |
| EP | 2 511 922 A1 | 10/2012 | | |
| JP | 2013-84787 A | 5/2013 | | |

OTHER PUBLICATIONS

European Search Report dated Sep. 8, 2020 issued in related European Patent Application No. 20 169 043.5.

* cited by examiner

*Primary Examiner* — Eric W Thomas
(74) *Attorney, Agent, or Firm* — Gordon Rees Scully Mansukhani, LLP

(57) ABSTRACT

A DC link capacitor cooling system having an integrated heat sink disposed across a bottom surface of a DC link capacitor with a dielectric thermal interface material covering the integrated heat sink, and a chassis contacting the dielectric thermal interface material, wherein the chassis has an active fluid coolant domain therein.

5 Claims, 4 Drawing Sheets

DC LINK CAPACITOR COOLING SYSTEM

TECHNICAL FIELD

The present invention relates to DC link capacitors that are used in electric vehicles.

BACKGROUND OF THE INVENTION

A DC link capacitor consists of capacitor windings and has positive and negative conductors placed within an enclosure (which is typically made of plastic). A dielectric resin is poured into the enclosure to give rigidity to the capacitor and protect the capacitor internals from a short circuit.

Electric vehicles use DC link capacitors in the vehicle's Power Inverter Module (PIM). DC link capacitors are used to prevent ripple currents from reaching back to the power source, and to smooth out DC bus voltage variations. DC Link capacitors are also used to protect semiconductors in the vehicle's electrical system.

It is advantageous to use a capacitor that has a long life. As such, when using a capacitor as a DC link in the vehicle's Power Inverter Module (PIM), power film capacitors are preferred over electrolytic capacitors. This is due to the longer life of power film capacitors. The life of a DC link power film capacitor is basically a function of the ratio of the working voltage/rated voltage and the maximum thermal hotspots within the capacitor windings. As such, the long life of the capacitor can be maintained if thermal hotspot temperatures are controlled within the boundary of the dielectric material. Therefore, it is desirable to reduce and control thermal hotspots to thereby operate the capacitor in a manner that maintains a long life. To properly control thermal hotspots, a system for cooling the capacitor is therefore especially desired.

SUMMARY OF THE INVENTION

The present system provides a cooling system for a DC link capacitor, for example a DC link capacitor used in an electric vehicle's Power Inverter Module (PIM).

In one preferred aspect, the present system integrates a heat sink to the DC link capacitor, and passes heat from the capacitor into an active coolant (fluid passage) domain. By providing this thermal coupling, thermal hotspots can be maintained below the operating boundary of the dielectric material in the capacitor without requiring a larger capacitance or higher voltage rated capacitor.

In preferred aspects, the present system adds a heat sink directly to the bottom of the capacitor. For example, this heat sink preferably simply replaces the bottom side of a typical capacitor enclosure. In addition, a dielectric thermal interface material is positioned at various locations in the system which may include: between busbars, between the busbar and the heat sink and between the heat sink and the chassis (i.e.: the electronics housing). In operation, heat is dissipated from the capacitor through the chassis and into the active flowing coolant passing through a cooling domain in the chassis.

Advantages of the present system include the heat sink allowing for thermal dissipation of ohmic heating from the capacitor, thereby permitting the capacitor to function at higher operating temperatures as compared to traditional DC link capacitors. Moreover, thermal hotspots can be maintained below the operating boundary of the dielectric material without requiring a larger voltage capacitor or a higher voltage rated film capacitor.

DETAILED DESCRIPTION OF THE DRAWINGS

Figure 1:
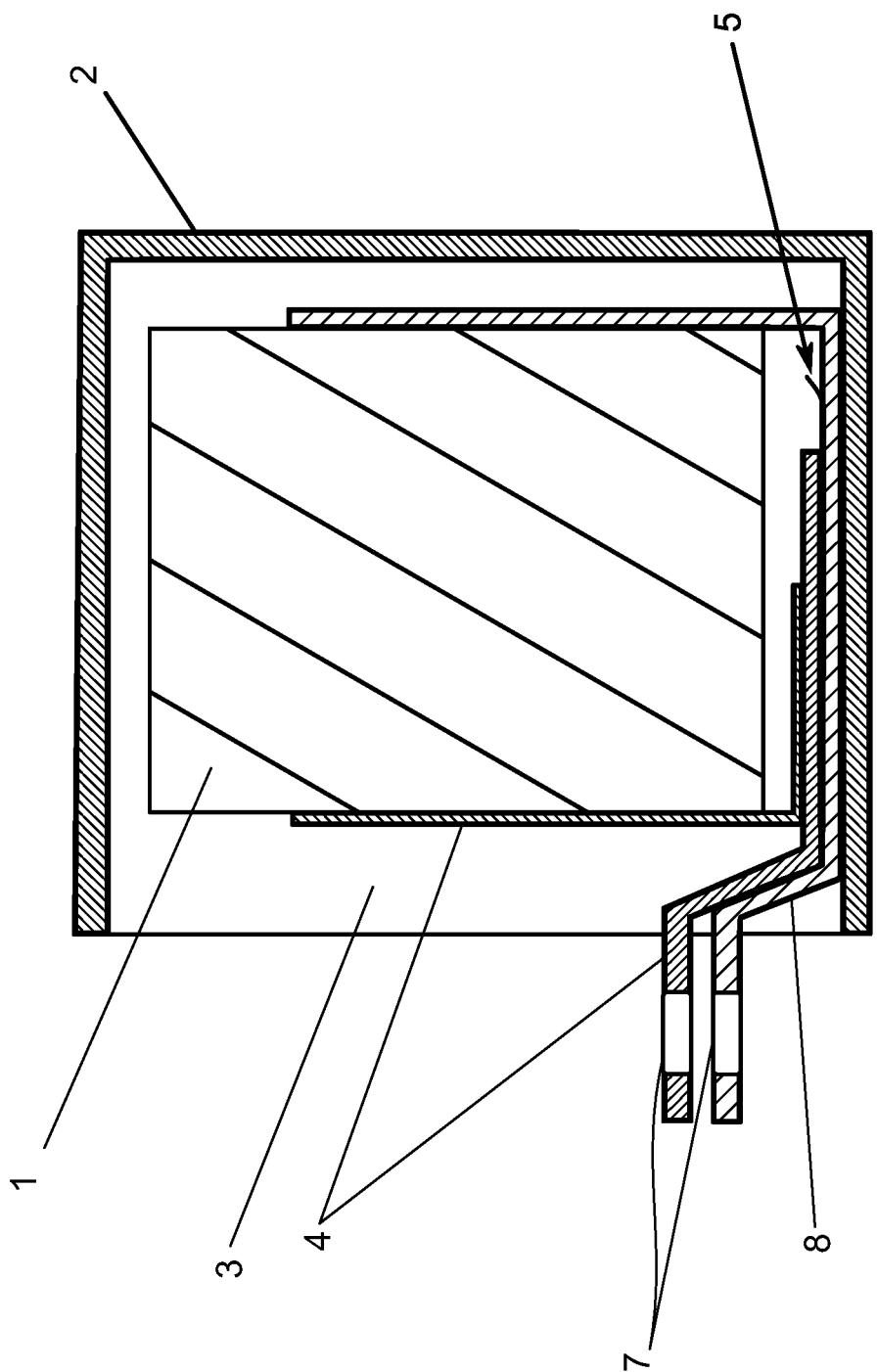
FIG. 1 is a sectional side elevation view of a prior art DC link capacitor.
Figure 2:
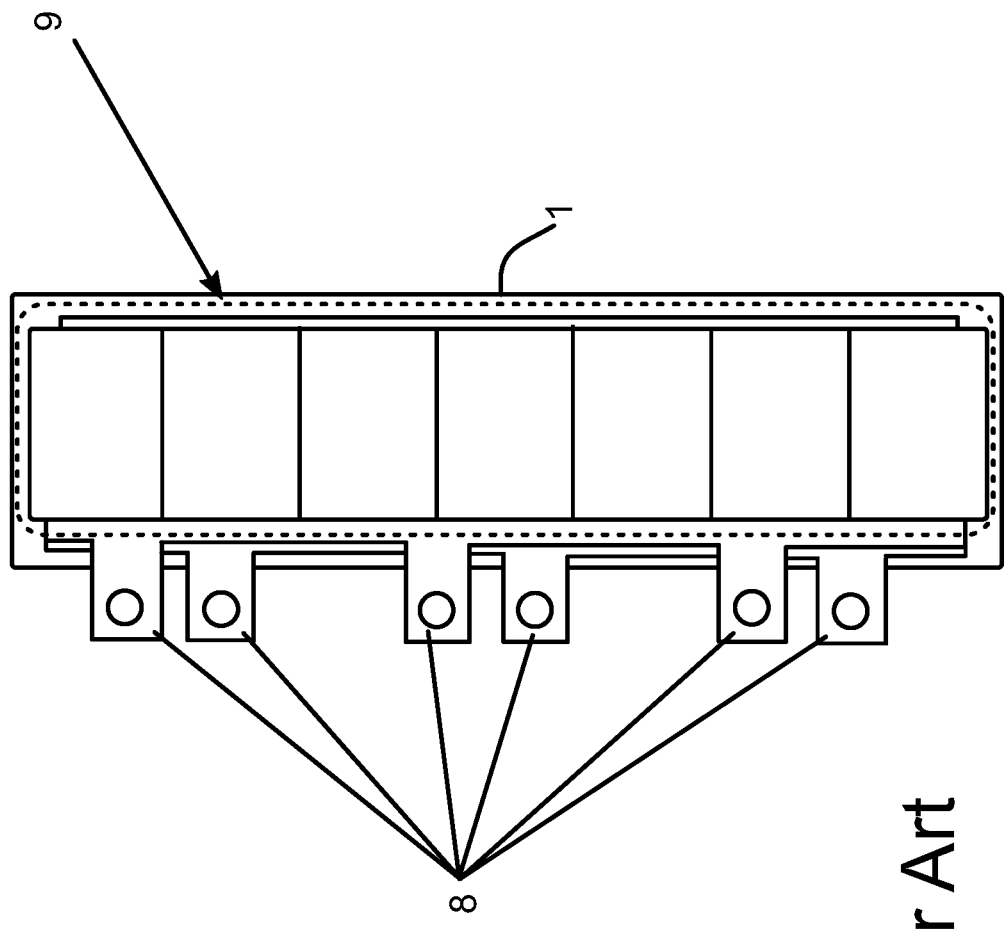
FIG. 2 is a top plan view of the prior art DC link capacitor of FIG. 1.

FIGS. 1 and 2 illustrate a prior art DC link capacitor 1, as follows. Capacitor 1 comprises capacitor windings 9 (FIG. 2) disposed in parallel with positive busbars 4 (FIG. 1) on the cathode end of the windings, and disposed in parallel with negative busbars 6 (FIG. 1) on the anode end of the windings. The positive busbars 4 and the negative busbars 6 are separated by a dielectric layer 5. As can be seen, all of these components are housed within an enclosure or housing 2 with dielectric resin 3 therein. In operation, capacitor 1 may be part of the Power Inverter Module (PIM) of an electric vehicle that is positioned within an electronics enclosure, commonly referred to as the chassis.

Unfortunately, the prior art design of FIGS. 1 and 2 has difficulty with heat dissipation from the chassis. Specifically, it is difficult to dissipate heat from the capacitor windings 9 and from the positive and negative busbars 4 and 6. The high thermal impedance (caused primarily by the lack of thermally conductive material in the capacitor housing 2) can lead to sub-optimal lifetime performance of the capacitor.

Figure 3:
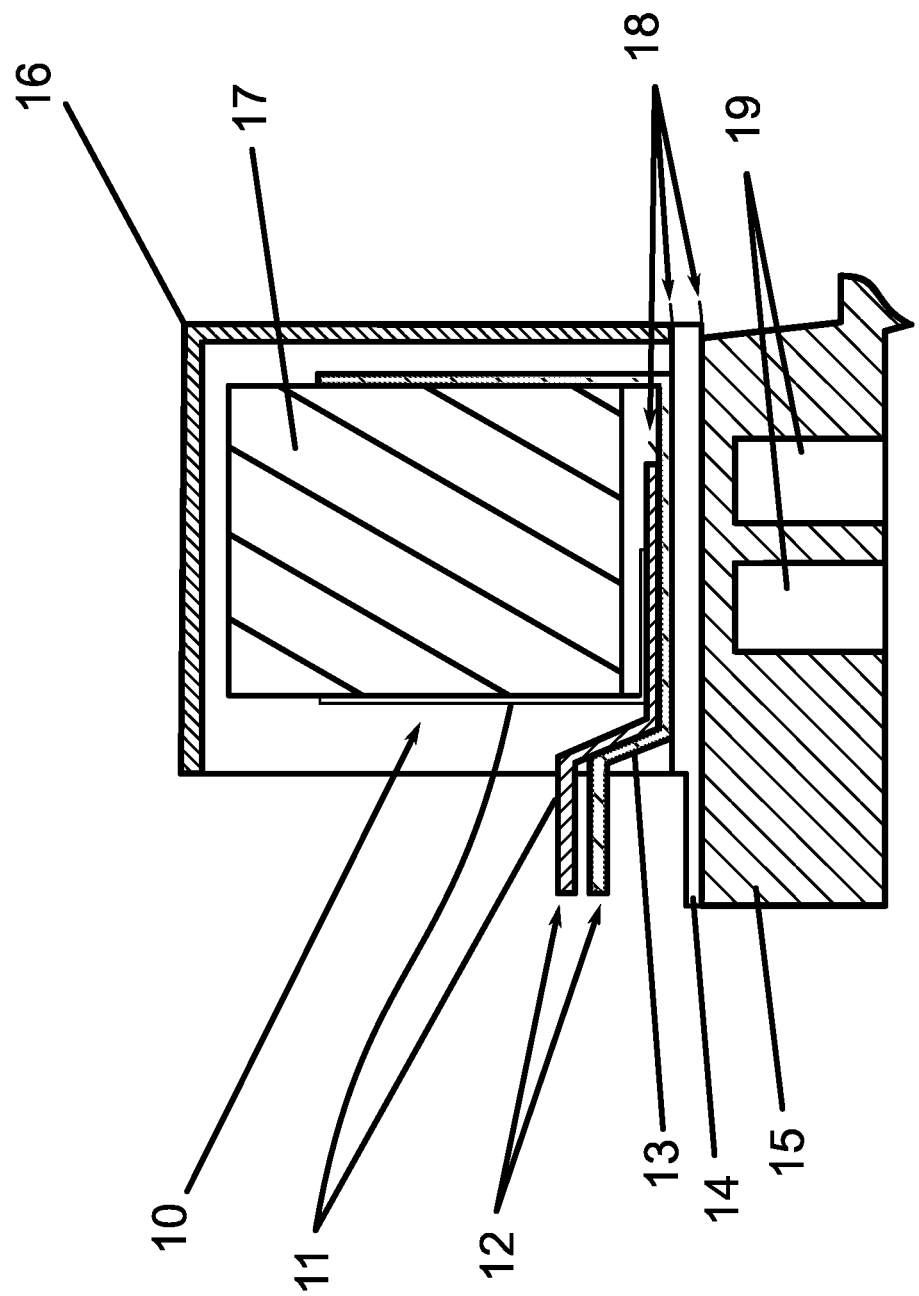
FIG. 3 is a sectional side elevation view of the present DC link capacitor positioned on top of an integrated heat sink with dielectric thermal interface material positioned on top of a chassis with an active fluid cooling domain passing through the chassis.

FIG. 3 illustrates the present preferred capacitor cooling system, as follows. As will be shown, the present cooling system enhances heat transfer from the capacitor windings, passing through the busbars 4 and 6 and then into a fluid domain 19 such that heat can effectively be dissipated away from the Power Inverter Module (PIM).

First, the plastic bottom of a standard capacitor housing (2 in FIG. 1) is removed and replaced by a thermally conductive heat sink 14. Thermally conductive heat sink 14 may optionally be made of aluminum or copper or other suitable material. A dielectric material 18 is then preferably used to separate the busbar connection terminals 13 from one another, to separate the negative busbar 13 from heat sink 14, and to separate heat sink 14 from the chassis 15. Chassis 15 preferably has an active fluid coolant domain 19 therein. As can be seen, active fluid coolant domain 19 is preferably positioned directly below capacitor 1. As such, coolant flow through regions 19 is used to cool capacitor 1. Moreover, the cooling of capacitor 1 can be done prior to cooling a system Insulated Gate Biopolar Transistor (IGBT) module.

The advantage of the present system is that it lowers thermal impedance and increases thermal conductivity from the capacitor windings through the chassis. As a result, the system can function at higher operating temperatures. This increases the life expectancy of the capacitor.

Figure 4:
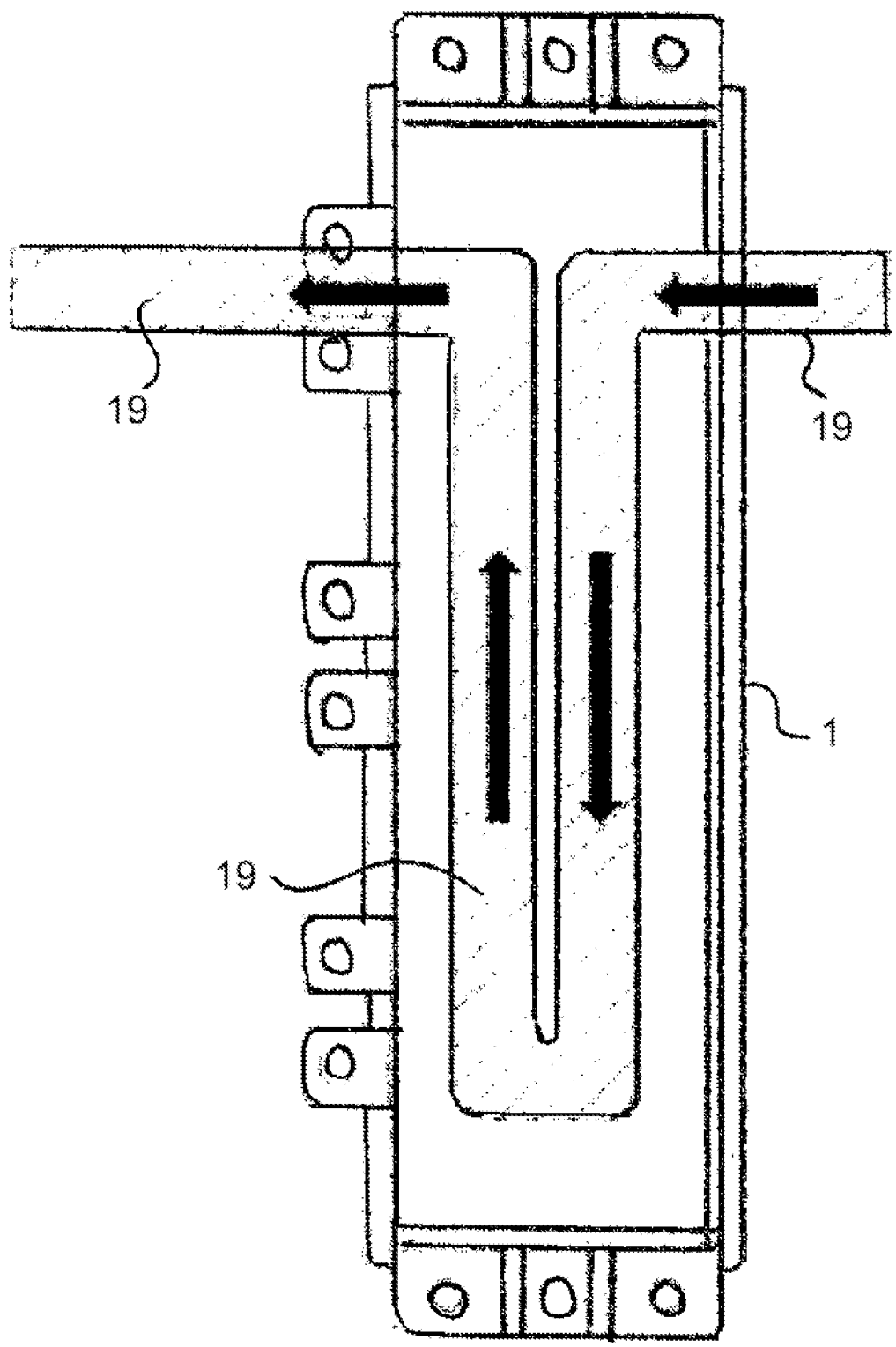
FIG. 4 is a top plan view of the capacitor of FIG. 3, showing the coolant flow path.

Lastly, FIG. 4 shows the path of coolant flow (i.e.: the path of fluid passing through domains 19) superimposed on the capacitor. Note: the capacitor is positioned above the coolant flow, and FIG. 4 simply shows the path that the coolant flow passes underneath the capacitor. As can be seen, the coolant flow path preferably goes back and forth along the major length of the capacitor to provide effective cooling.

What is claimed is:

1. A capacitor cooling system, comprising:
    a DC link capacitor having major and minor dimensions viewed from an overhead perspective;
    positive and negative busbars extending underneath the DC link capacitor;
    wherein one of the positive and negative busbars overlies the other of the positive and negative busbars and the busbars are separated by a first layer of dielectric thermal interface material;
    an integrated heat sink disposed across a bottom surface of the DC link capacitor, wherein the other of the positive and negative busbars is separated from the integrated heat sink by a second layer of dielectric thermal interface material; and
    wherein the heat sink is located on a chassis, and wherein the heat sink is separated from the chassis by a third layer of dielectric thermal interface material, and
    wherein the chassis has an active fluid coolant domain therein, and wherein the active fluid coolant domain has fluid passing therethrough, and wherein the active fluid coolant passes through a flow path that travels back and forth along the major dimension of the capacitor.

2. The capacitor cooling system of claim 1, wherein the capacitor is a power film capacitor.

3. The capacitor cooling system of claim 1, wherein the capacitor comprises positive and negative conductors sealed into an enclosure with dielectric resin.

4. The capacitor cooling system of claim 1, wherein the DC link capacitor is used in an electric vehicle's power inverter module.

5. The capacitor cooling system of claim 1, wherein the integrated heat sink is made of aluminum or copper.

* * * * *